US012584516B2

(12) United States Patent
Pesce et al.

(10) Patent No.: US 12,584,516 B2
(45) Date of Patent: Mar. 24, 2026

(54) BEARING ADAPTERS FOR SINGLE-AXIS TRACKERS

(71) Applicant: Ojjo, Inc., San Rafael, CA (US)

(72) Inventors: Katie Pesce, El Cerrito, CA (US); Greg McPheeters, Santa Cruz, CA (US)

(73) Assignee: OJJO, Inc., San Rafael, CA (US)

( * ) Notice: Subject to any disclaimer, the term of this patent is extended or adjusted under 35 U.S.C. 154(b) by 0 days.

(21) Appl. No.: 16/810,012

(22) Filed: Mar. 5, 2020

(65) Prior Publication Data

US 2020/0284293 A1 Sep. 10, 2020

Related U.S. Application Data

(60) Provisional application No. 62/875,924, filed on Jul. 18, 2019, provisional application No. 62/814,789, filed on Mar. 6, 2019.

(51) Int. Cl.
| | |
|---|---|
| *H02S 30/10* | (2014.01) |
| *F16C 17/03* | (2006.01) |
| *H02S 20/32* | (2014.01) |
| *F24S 30/00* | (2018.01) |

(52) U.S. Cl.
CPC ............ *F16C 17/035* (2013.01); *H02S 20/32* (2014.12); *H02S 30/10* (2014.12); *F24S 2030/15* (2018.05)

(58) Field of Classification Search
CPC ........ Y02E 10/47; Y02E 10/50; F24S 30/425; F24S 2030/15; F24S 25/10
See application file for complete search history.

(56) References Cited

U.S. PATENT DOCUMENTS

| | | | | |
|---|---|---|---|---|
| 587,695 | A | * | 8/1897 | Billing |
| 4,832,001 | A | * | 5/1989 | Baer ....................... F24S 50/20 |
| | | | | 136/246 |
| 5,228,924 | A | * | 7/1993 | Barker .................. F24S 30/425 |
| | | | | 136/246 |
| 5,584,311 | A | | 12/1996 | Schaefer |
| 7,484,772 | B2 | * | 2/2009 | Thorensen ............ F16L 27/093 |
| | | | | 285/190 |

(Continued)

FOREIGN PATENT DOCUMENTS

| | | |
|---|---|---|
| EP | 1795829 A2 | 6/2007 |
| KR | 1020160144628 A | 12/2016 |
| WO | 2013158639 A1 | 10/2013 |

OTHER PUBLICATIONS

International Search Report fro PCT/US2020/058021 issued Mar. 8, 2021.

(Continued)

*Primary Examiner* — Brian E Glessner
*Assistant Examiner* — Daniel J Kenny
(74) *Attorney, Agent, or Firm* — Fredrikson & Byron, P.A.

(57) ABSTRACT

Bearing adapters for use with truss foundations supporting mechanically balanced single-axis trackers. The bearing adapter joins the free ends of a pair of adjacent truss legs to form a rigid A-frame shaped foundation structure. A bearing is formed in an upper portion of the bearing adapter to allow a torque tube to be suspended from a pin in the bearing and to swing through an arc bounded by the bearing adapter. The bearing may have a catenoid shape to compensate for misalignment in multiple directions.

11 Claims, 9 Drawing Sheets

(56)  References Cited

U.S. PATENT DOCUMENTS

| | | | | |
|---|---|---|---|---|
| 7,485,059 | B2 * | 2/2009 | Fadler | F16H 55/44 |
| | | | | 474/166 |
| 8,413,391 | B2 * | 4/2013 | Seery | F16B 2/12 |
| | | | | 52/173.3 |
| 8,578,929 | B2 * | 11/2013 | Krabbe | F24S 30/455 |
| | | | | 126/605 |
| 8,609,977 | B2 * | 12/2013 | Jones | F24S 30/425 |
| | | | | 250/203.1 |
| 9,207,000 | B2 * | 12/2015 | Kruse | F24S 30/425 |
| 9,633,585 | B1 * | 4/2017 | Hanes | G09F 15/0012 |
| 10,320,326 | B2 * | 6/2019 | Schimelpfenig | F16M 11/10 |
| 10,788,102 | B2 * | 9/2020 | Cisek | F16H 1/48 |
| 2008/0029148 | A1 * | 2/2008 | Thompson | F24S 25/16 |
| | | | | 136/244 |
| 2012/0006317 | A1 * | 1/2012 | Sade | H02S 20/32 |
| | | | | 126/569 |
| 2013/0319402 | A1 * | 12/2013 | Shaw | F24S 50/20 |
| | | | | 126/600 |
| 2013/0340807 | A1 * | 12/2013 | Gerwing | H02S 30/20 |
| | | | | 136/246 |
| 2015/0059826 | A1 | 3/2015 | Reed et al. | |
| 2015/0176280 | A1 | 6/2015 | Brothersen | |
| 2015/0236636 | A1 * | 8/2015 | Sade | H02S 30/10 |
| | | | | 136/246 |
| 2016/0013751 | A1 * | 1/2016 | Michotte De Welle | |
| | | | | F24S 30/425 |
| | | | | 136/246 |
| 2016/0329860 | A1 | 11/2016 | Kalus et al. | |
| 2017/0072260 | A1 * | 3/2017 | Jackson | A63B 23/1218 |
| 2017/0301814 | A1 | 10/2017 | Au | |
| 2018/0224161 | A1 | 8/2018 | Au | |

OTHER PUBLICATIONS

International Search Report PCT/US2020/021178, issued Jun. 19, 2020.

* cited by examiner

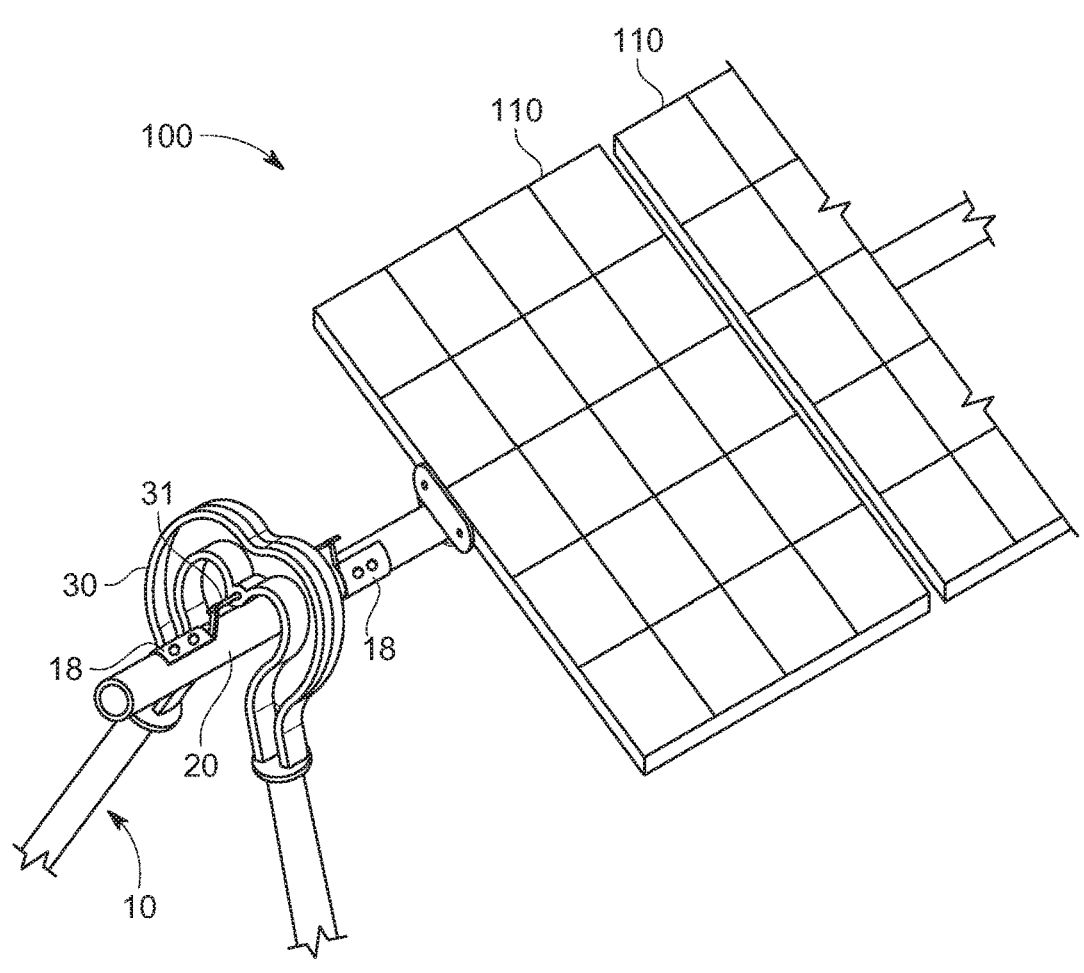
FIG. 1A
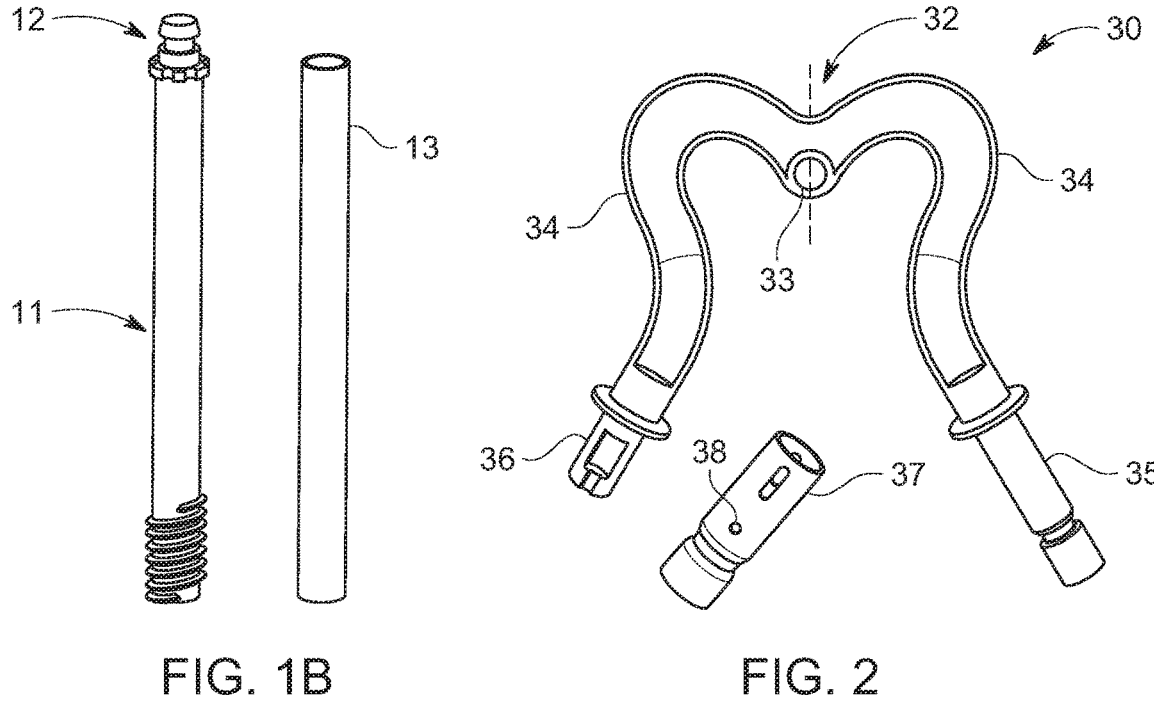
FIG. 1B            FIG. 2

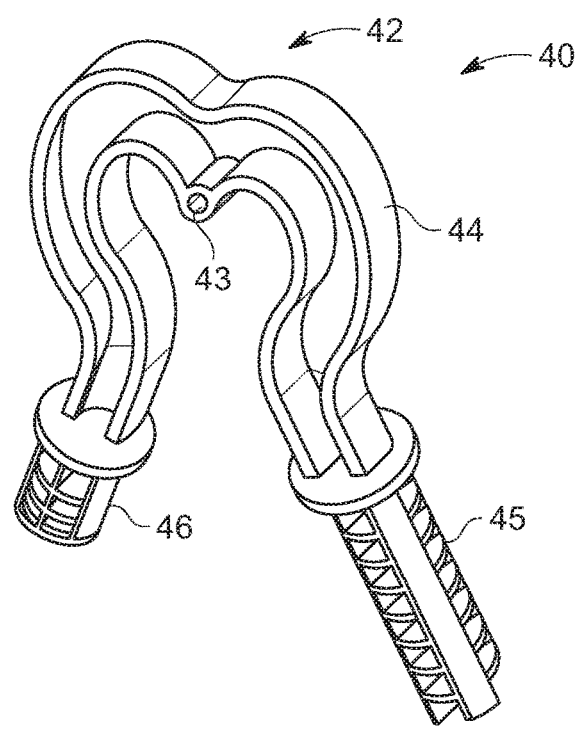
FIG. 3A
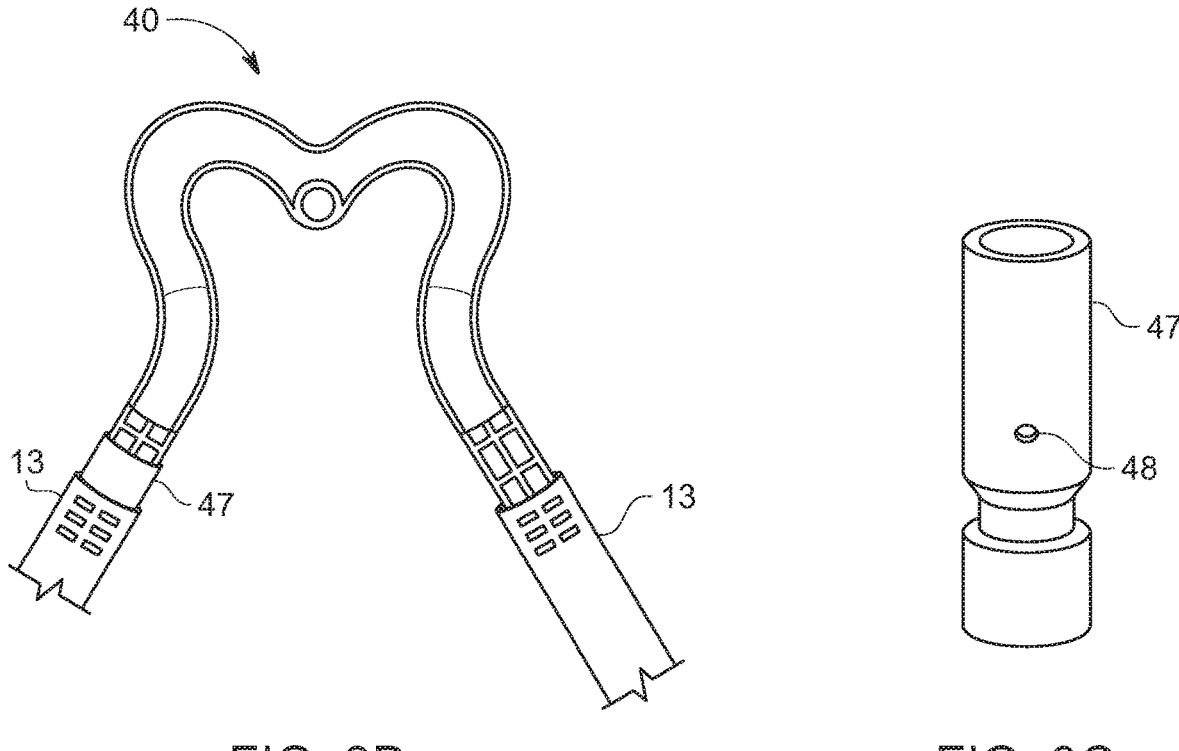
FIG. 3B
FIG. 3C

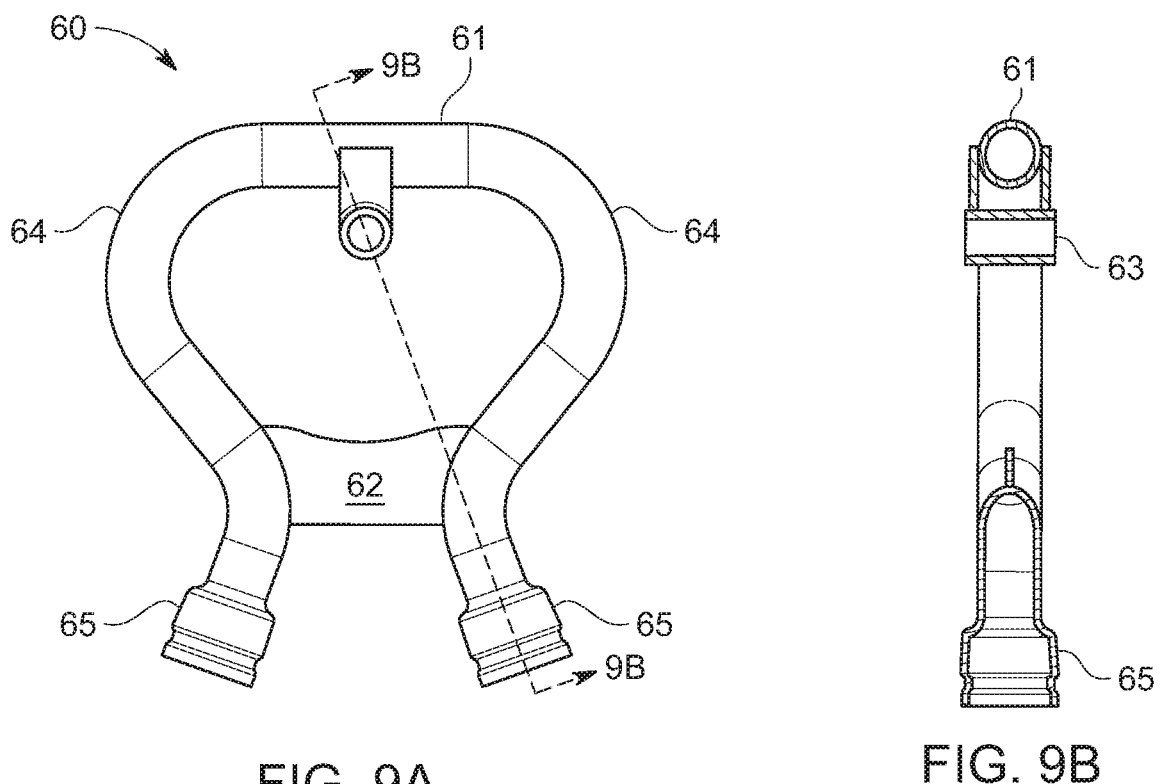
FIG. 9A
FIG. 9B
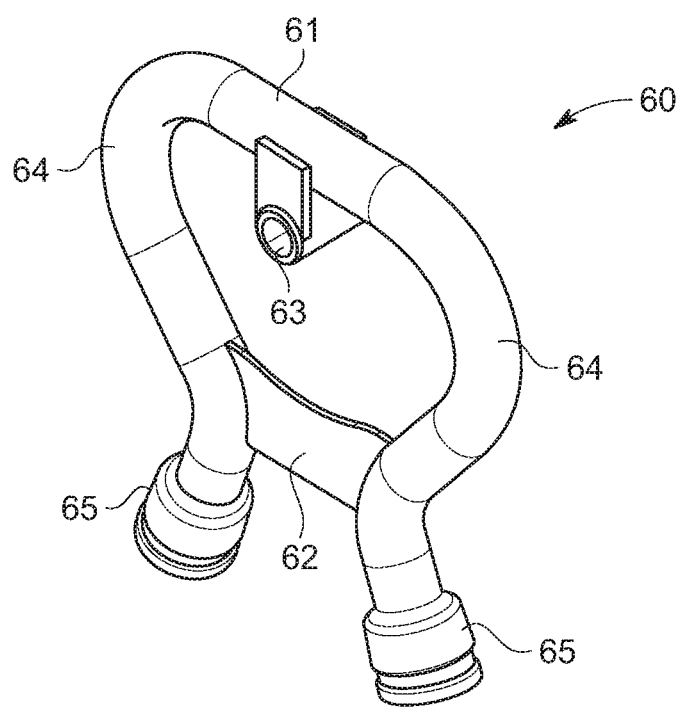
FIG. 9C

BEARING ADAPTERS FOR SINGLE-AXIS TRACKERS

CROSS-REFERENCE TO RELATED APPLICATIONS

This claims priority to U.S. provisional patent application Nos. 62/875,924 filed on Jul. 18, 2019, titled "Bearing adapters for single-axis trackers supported by truss foundations," and 62/814,789, filed on Mar. 6, 2019, titled "Bearing housing assemblies and related systems and methods for A-frame foundation supporting mechanically balanced single-axis trackers," the disclosures of which are hereby incorporated by reference in their entirety.

BACKGROUND

Solar energy is one of Earth's largest potential sources of energy. Above the atmosphere, solar irradiance per unit area is 1.361 kilowatts per square meter. At sea level, the usable energy density is reduced to 250 watts per square meter. Using a two-dimensional model to approximate the Earth, 250 watts/square meter*$\pi$*6,371,000 meters$^2$ yields about 32,000 terra (trillion) watts of energy that continuously strikes Earth's surface. Assuming the sun continues to burn and emit photons for a billion more years, the survival of human life ultimately depends on harnessing this essentially unlimited, source of clean energy.

The main impediment to widescale solar adoption thus far has been cost. Unlike other energy sources, solar energy costs are frontloaded while the operating costs are comparatively low. Fossil fuel-based energy sources require up-front costs as well as pay-as-you-go costs from consuming fuel. Unfortunately, not all the ongoing costs are reflected in the price of energy generated from fossil-fuel sources. These "dirty" energy sources have significant external costs stemming from $CO_2$ emissions that, in the absence of a carbon tax, are not yet reflected in the cost to consumers. In addition, entrenched utilities and fossil fuel producers have lobbied effectively to stymie the progress of solar, even in states with the greatest solar potential.

Notwithstanding these headwinds, the cost of solar has now dropped low enough that even when coupled with energy storage, it is equivalent to or less expensive than coal, oil and even natural gas. In the context of the electricity market, the relative cost difference between competing sources is quantified in terms of the cost per unit of energy, typically a kilowatt hour (kWh). Large scale solar arrays, so called "utility-scale" arrays, may have tens to hundreds of megawatts of power generating capacity, putting them on the same scale as small coal and natural gas-fired power plants. These arrays usually generate power that is fed into the grid and sold at wholesale prices on the order of a few cents per kWh. The development of utility-scale solar projects is funded with so-called power purchase agreements (PPAs). With a PPA, an off-taker (e.g., utility, grid operator, etc.) agrees to purchase all the power generated by the system at a fixed rate for the operational life of the array (e.g., 30 years). This enables a bank or other investor to accurately value the predicted future stream and to loan money against it to finance construction of the array.

Utility-scale solar power plants are predominantly configured as fixed-tilt ground mounted arrays or single-axis trackers. Fixed-tilt arrays are arranged in East-West oriented rows of panels tilted South at an angle dictated by the latitude of the array site—the further away from the equator, the steeper the tilt angle. By contrast, single-axis trackers are installed in North-South rows with the solar panels attached to a rotating axis called a torque tube that move the panels from an East-facing orientation to a West-facing orientation throughout the course of each day, following the sun's progression through the sky. For purposes of this disclosure, both fixed-tilt and single-axis trackers are referred to collectively as axial solar arrays.

Most single-axis tracker makers use one of two possible configurations for attaching the torque tube to the monopile foundation. The most common attaches the torque tube support element (e.g., bearing housing, bearing housing support, etc.) to the top, flange or sides of a row of standard H-piles. The bearing surrounds the torque tube and the tube rotates inside of it like an axle within a wheel bearing. Monopiles typically have holes or slots formed at one end, in each flange or in the web, so that the torque tube support elements can be easily attached and adjusted in the vertical and in some cases even the horizontal direction to align the torque tube with the other piles and bearing housings in the row. One commercially available system using such bottom-up configuration is the DuraTrack HZ single-axis tracker from ARRAY TECHNOLOGIES, INC. of Albuquerque, NM In the DuraTrack system, the torque tube rotates directly about its axis within a bearing that sits on top of an H-pile. Many other tracker makers use this same bottom-up design.

Although less commonly employed, at least one tracker maker has successively commercialized a tracker with a top-down configuration where the torque tube hangs by a bracket from hinge pin that allows the entire tube to swing like a pendulum rather than rotating about its own axis. The drive motor is offset from the center of the torque tube to be aligned with the center of rotation of the system which, in this system, is a bearing pin. Known commercially as the NX Horizon single-axis tracker from NEXTRACKER INC. of Fremont, CA, this tracker purports to be mechanically balanced meaning that the amount of torque required to move the torque tube is the same at all panel angles. Bottom-up systems require more torque to resist gravity as the angle of the modules with respect to the ground becomes steeper, but in the balanced system the required torque remains constant and overturning moments are reduced. However, because the torque tube hangs, it swings through an arc rather and therefore, needs clearance in the East-West direction from the structure holding the tube—a constraint not present on bottom-up systems. To accommodate, NEXTracker attaches a pair of right-angle brackets to the outside face of each flanges of the H-pile to provide a horizontal mounting platform with greater width than provided by the H-pile alone. A—upside-down U-shaped bearing housing assembly is then mounted this horizontal platform and the torque tube is hung from a bearing pin seated in a bearing at the center of the upside-down U.

Excluding land acquisitions costs, overall project costs for utility-scale arrays may include site preparation (road building, leveling, grid and water connections etc.), foundations, tracker or fixed-tilt hardware, solar panels, inverters and electrical connections (conduit, wiring, trenching, grid interface, etc.). Many of these costs have come down over the past few years due to ongoing innovation and economies of scale, however, one area that has been largely ignored is foundations. Foundations provide a uniform structural interface that couples the system to the ground. When installing a conventional single-axis tracker, after the site has been prepared, plumb monopiles are usually driven into the ground at regular intervals dictated by the tracker manufacturer and site plan; the tracker system components are subsequently attached to the head of those piles. Most often, the piles used to support the tracker have an H-shaped profile, but they may also be C-shaped or even box-shaped. In conventional, large-scale single-axis tracker arrays, the procurement and construction of the foundations may represent up to 5-10 percent of the total system cost. Despite this relatively small share of the total cost, any savings in steel and labor associated with foundations will amount to a significant amount of money over a large portfolio of solar projects. Also, tracker development deals are often locked-in a year or more before the installation costs are actually incurred, so any post-deal foundation savings that can be realized will be on top of the profits already factored in to calculations that supported the construction of the project.

One reason monopiles continue to dominate the market for single-axis tracker foundations is simplicity. It is relatively easy to drive monopiles into the ground along a straight line with existing technology, however, the design is inherently wasteful. The physics of a monopile mandates that it be oversized because single structural members are not good at resisting bending forces. When used to support a single-axis tracker, the largest forces on the foundation are not from the weight of the components, but rather the combined lateral force of wind striking the solar panels. This lateral force gets translated into the foundation as a bending moment. The magnitude of this force is much greater than the static loading attributable to the weight of the panels and tracker components. It acts like a lever arm trying to bend the pile, and the longer the lever arm, the greater the magnitude of the force. Many tracker companies specify a minimum foundation height of 40-inches or more. Therefore, in the context of single-axis trackers, monopile foundations must be oversized and driven deeply into the ground to withstand lateral loads.

One proposed alternative to monopile foundations is to use a pair of moderately angled legs to form an A-frame or truss-like foundation. Truss foundations have the potential to increase utility-scale solar installations by reducing costs relative to monopiles. One reason for this is that truss foundations translate lateral loads on the tracker into axial forces of tension and compression in the truss legs rather than into bending. Because single structural members are poor at resisting bending relative to their ability to resist axial forces, heavier and thicker steel must be used when supporting a single-axis tracker with monopiles relative to truss foundations. Also, because the legs of the truss are resisting lateral loads mostly with tension and compression in the legs, the legs do not need to be driven as deeply as an equivalent monopile. In addition to saving steel, this reduces the chances of encountering sub-surface rock. The monopile mitigation process for overcoming a refusal due to rock is nearly ten times as expensive as simply beating a monopile into the ground so any reductions in refusals will save project installation costs.

Finally, for some trackers, tracker-to-foundation integration has the potential to further reduce costs relative to H-piles. It is possible for the apex hardware that joins adjacent truss legs to form the A-frame-shaped structure to also make up a portion of the tracker, thereby reducing the overall part count. Specifically, by joining adjacent truss legs with the same component that provides the bearing for the tracker's rotating member (i.e., the torque tube, bearing pin, etc.), the combined tracker and foundation can be made and constructed less expensively. To that end, it is an object of various embodiments of this disclosure to provide a bearing adapters that provide a truss or A-frame foundation for single-axis trackers applications, thereby optimizing the amount of steel and depth of embedment needed for a given diameter leg.

BRIEF DESCRIPTION OF THE DRAWINGS

FIG. 1A shows a portion of single-axis tracker according to various embodiments of the invention;

FIG. 1B shows components of a truss leg usable with various embodiments of the invention;

FIG. 2 shows a bearing adapter according to various embodiments of the invention;

FIGS. 3A-C show another bearing adapter usable with a truss foundation according to various embodiments of the invention;

FIGS. 9A-C show different views of the bearing adapter of FIG. 8; and

DETAILED DESCRIPTION

Figure 4A:
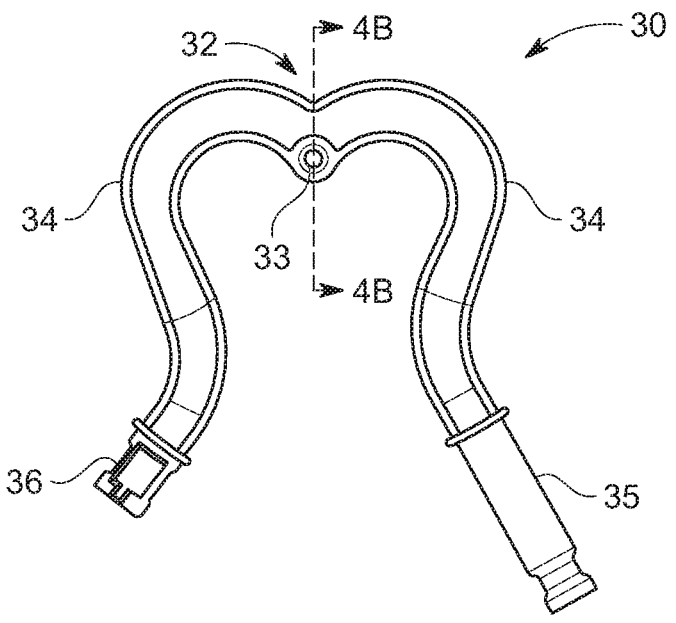
FIG. 4A shows another bearing adapter usable with a truss foundation according to further embodiments of the invention.

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Turning to FIG. 1A, this figure shows a portion of a single-axis tracker 100 supported by truss foundation 10 according to various exemplary embodiments of the invention. The portion shown includes a partial foundation 10 attached to bearing adapter 30 that supports a section of suspended torque tube 20. The term "bearing adapter" is used generically herein to refer to structure that performs the function of an adapter that joins adjacent truss legs and a tracker bearing assembly. That is, it structurally joins the free, above ground ends of the adjacent truss legs as well as providing a bearing to receive a rotating member that allows the torque tube to move. In the example of FIG. 1, the rotating member is a bearing pin 31 from which the torque tube is connected. In other embodiments, the rotating member may be the torque tube itself. In such embodiments, the bearing opening will be much larger to accommodate the torque tube, and the bearing adapter need not be as wide or tall because the torque tube rotates in place rather than swinging like a pendulum about the bearing.

The legs of the foundation have been cut-off to focus on the elements that are the subject of the present disclosure. In this example, torque tube 20 is suspended from hinge pin 31 passing through bearing adapter 30 via hinge brackets 18. Several PV modules 110 are attached to the section of torque tube 20 via C-clamp brackets joining the frame of each module to the torque tube. For ease of illustration, only a portion of the array is shown. In an actual installation, there would be several such foundations and bearing adapters spaced along torque tube 20 and at least one motor or drive linkage to move the rotating assembly, thereby keeping the panels on-sun (i.e., normal to the sun) throughout the day. The tracker shown in FIG. 1A is a top-down system such as that manufactured and sold by NEXTRACKER INC, of Freemont, CA where, as discussed above, the torque tube is suspended from a pin above the tube rather than resting in a circular bearing that sits on the foundation. In this example, a unique bearing adapter is shown that not only provides a bearing to suspend the torque tube from and bounds the extent of the tube's East and West swing, but also as discussed in greater detail herein, completes the A-frame by interconnecting the free ends of each truss leg to form a rigid truss foundation. In various embodiments, this connection is effected by inserting a portion of the bearing adapter into each leg and crimping it in place.

In this example, bearing adapter 30 has a cardioid shape. The cardioid shape is characterized by a pair of symmetric S-shaped arms that follow opposing S-shaped paths and meet in the middle at a cusp. The distal end of each S-shaped arm is spaced apart and angled to match the angle and distance between the adjacent legs of the truss foundation. It should be appreciated that other shapes may also be possible.

FIG. 1B shows the components of truss foundation system 10. They include a pair of screw anchors 11, a pair of upper legs 13 and a driving coupler 12 at the upper end of the screw anchor. Coupler 12 is used to drive the screw anchor into supporting ground as well as to join the upper leg to the screw anchor. In some embodiments, this coupler or collar may be welded to the head of each base pile. In other embodiments, it may be pinned on in the field before or after the pile is driven. The coupler may have teeth formed in it to enable the it to mate with the driving head of a rotary driving machine to transfer torque to the pile while driving. Once the pair of adjacent base piles are driven at the desired foundation location, the upper or extension piles are coupled to their respective base piles. In various embodiments this is accomplished by inserting an end of each upper pile over the coupler or collar until it rests on the ledge of the coupler. The alternating sloped surfaces of the coupler allow the upper pile to be adjusted axially so that both are in the same plane and point at the desired work point. Once the proper alignment is achieved, a crimping tool may be used to crimp the portion of the upper pile over the channel formed in the coupler to lock the upper pile to the base pile and to preserve the orientation of the upper piles. Then, the bearing housing assembly is attached to free ends of the upper pile to complete the A-frame, as discussed in greater detail below.

As shown, screw anchor 11 includes an external thread form at the lower end. In various embodiments, such a screw anchor is driven into the ground with a rotary driver until the driven end is at or near to grade. In various embodiments, adjacent legs 10 are driven at reciprocal angles to one another. For example, the piles may be driven at ±60 degrees, leaning towards one another. In other embodiments, they may be driven at reciprocal angles in a range spanning from 55 degrees to 72.5 degrees. In various embodiments, an articulating coupler may be attached to the head of each base pile. It should be appreciated that although an articulating crimp collar is shown in the figures, that other techniques may be used to couple upper piles to their respective base piles without departing from the spirit or scope of the invention.

FIG. 2 shows a front view of bearing adapter 30 of FIG. 1 according to various embodiments of the invention. Bearing adapter 30 comprises a generally cardioid-shaped member formed with a central cusp 32 and a pair of symmetric opposing S-shaped arms 34 projecting toward and away from cusp 32. In various embodiments, adapter 30 may be formed by casting steel. In other embodiments, the assembly may be cold formed, such as through a stamping process. In various embodiments, a bearing such as bearing 33 is located at or near cusp 32 along the vertical midline of the assembly. In this context, "vertical" refers to the orientation of the assembly when it is installed with the cusp at the top and the distal end of each S-shaped arm at the bottom. In this example, bearing 33 consists of a tubular recess passing completely through the body of adapter 30. Each S-shaped arm 34 extends away from cusp 32, then curves back toward it before curving away to match the spacing and angle of truss legs 10. As discussed above, the terminal end of arms 34 may curve down and away from the midline at an angle in a range of 17.5 degrees to 35 degrees to match the angle of the corresponding truss legs 10, which are oriented at an angle in a range of 55 degrees to 72.5 degrees.

In various embodiments, and as shown here, although S-shaped arms 34 are symmetric, their distal features are not. The reason for this is that if both arms have ends that are the same length, it may not be possible to simultaneously insert the ends into their respective angled upper legs 13 even before they are crimped to screw anchors 11. Therefore, in the example of FIG. 2, one arm terminates in a welded crimp sleeve 35 that extends several inches beyond the end of arm 34 but along the same axis. In various embodiments, and as shown, welded crimp sleeve 34 is welded to the end of the arm and includes a crimp joint proximate to its distal end. The crimp joint is characterized by a section of narrower diameter that allows room for the upper pile to be crimped towards it. End portion 36 of the opposing arm is relatively shorter and includes a sleeve with twist-lock features. In this case, female features are shown, but in other embodiments male features may be used, or even a combination of male and female features. A detached twist-lock sleeve 37 is used to interface the relatively shorter twist-lock sleeve 36 to its upper leg 13, and by extension, bearing adapter 30 to truss foundation 10.

Installation of the components shown in FIGS. 1A/B and 2 is achieved as follows. Screw anchors 11 and upper legs 13 are installed in the manner discussed above in the context of FIG. 1B. Then, the relatively long welded crimp sleeve 35 of bearing adapter 30 is inserted into the free end of one of the upper legs. In various embodiments, crimp sleeve 35 will have an outside diameter slightly smaller than the inside diameter of upper leg 13 to enable a smooth fit with minimal slop. Crimp sleeve 35 may be uniform in diameter enabling the assembly to be rotated 360-degrees within upper leg 13 to rotate adapter 30 out of the way while the other side is configured.

Next, detached twist-lock crimp sleeve 37 inserted into the free end of the other upper leg so that the crimp joint end is down. In various embodiments, bump stop 38 is formed in sleeve 37 to prevent it from disappearing down into upper leg 13. Once inserted, adapter 30 is rotated around so that the relatively shorter twist-lock sleeve 36 is pointing at the inserted detached sleeve 37. Sleeve 37 is then slid axially upwards within the leg until it engages relatively shorter twist-lock sleeve 36. When the male and female features are properly oriented, detached sleeve 37 will slide up towards the arm 34. Once fully inserted, detached sleeve 37 is then rotated either clockwise or counter clockwise, until the male features are seated firmly against their respective stops. At this point, granular adjustment between adapter 30 and upper legs 13 may be performed by lifting or pushing down on bearing adapter 30 until bearing 33 is aligned with the desired work point and/or with other bearings in the same row. Installation is completed by crimping each upper leg 13 over the crimp joints formed in each of the detached and welded crimp sleeves 37/35. The crimp joints will preserve the assembly at the desired orientation. Crimping may be performed with a powered hand-held crimping device or an articulating crimper attached to the machine used to install the base piles.

Turning to FIGS. 3A-C, these figures show bearing adapter 40 according to various other embodiments of the invention. As with the exemplary embodiment shown in FIG. 2, adapter 40 is also characterized by a cardioid-shaped structure with a centrally positioned cusp 42 and a pair of symmetric opposing S-shaped arms 44 curving towards and away from the cusp. An integral bearing 43 positioned under cusp 42 and consists of an axial opening passing through adapter 40. As discussed herein, the adapter 40 may be formed from one or more cast pieces, by stamping, or by some other process. In this embodiment, each S-shaped arm 44 terminates in a crimp arm 45/46. Crimp arms 45/46 may be formed from the same casting as adapter 40 or may be formed separately and welded on after assembly 40 is formed. In this example, one arm 46 is labeled as the short crimp arm and the other the long crimp arm 45. The reason for having arms of different lengths is the same as that discussed above in the context of FIG. 2—that is, to enable simultaneous fitment with fixed upper legs 13. As shown in 3A and B, the crimp arms 45/46 include a plurality of crimp features. In these figures, the crimp features consist of a plurality of alternating ribs and voids as well as flat faces that provide clearance for upper leg 13 to be sleeved towards the crimp arm. This embodiment also includes detached crimp sleeve 47. Like the crimp sleeve 37 of the embodiment of FIG. 2, crimp sleeve 47 includes a crimp joint proximate to one end. Unlike sleeve 37, there are no twist-lock features present because the sleeve fits directly over short crimp arm 46 of adapter 40 and is crimped in place.

System installation is similar to that of adapter 30 of FIG. 2. After installing screw anchors 11 and upper legs 13, installation of bearing adapter 40 may begin. In this exemplary embodiment, installation begins by inserting long crimp arm 45 into a free end of one of the upper legs. In various embodiments, the outside diameter of crimp arm 45 is made slightly smaller than the inside diameter of upper leg 13 to allow the arm to easily enter but without too much slop. Once inside, adapter 40 may be rotated out of the way to allow access to the free end of the adjacent upper leg. The end of the crimp sleeve 47 containing the crimp joint is slid into the free end of the upper leg until bump stop 48 leg's opening. Then, adapter 40 is rotated back into play so that shorter crimp arm 46 is pointing at the detached crimp sleeve 47. Sleeve 47 is then slid back up until it covers at least a portion of short crimp arm 46. Bearing adapter 40 is then leveled and bearing 43 is aligned with the height and East-West position of the desired work point. Once aligned, upper leg 13 is crimped over the crimp joint area of the crimp sleeve 47 and directly on the sleeve along the portion of the sleeve that overlaps with the short crimp arm 46. Finally, the other leg is crimped to engage long crimp arm 45, thereby maintaining the orientation of the bearing adapter with the truss foundation's work point.

Figures 4B, 4C:
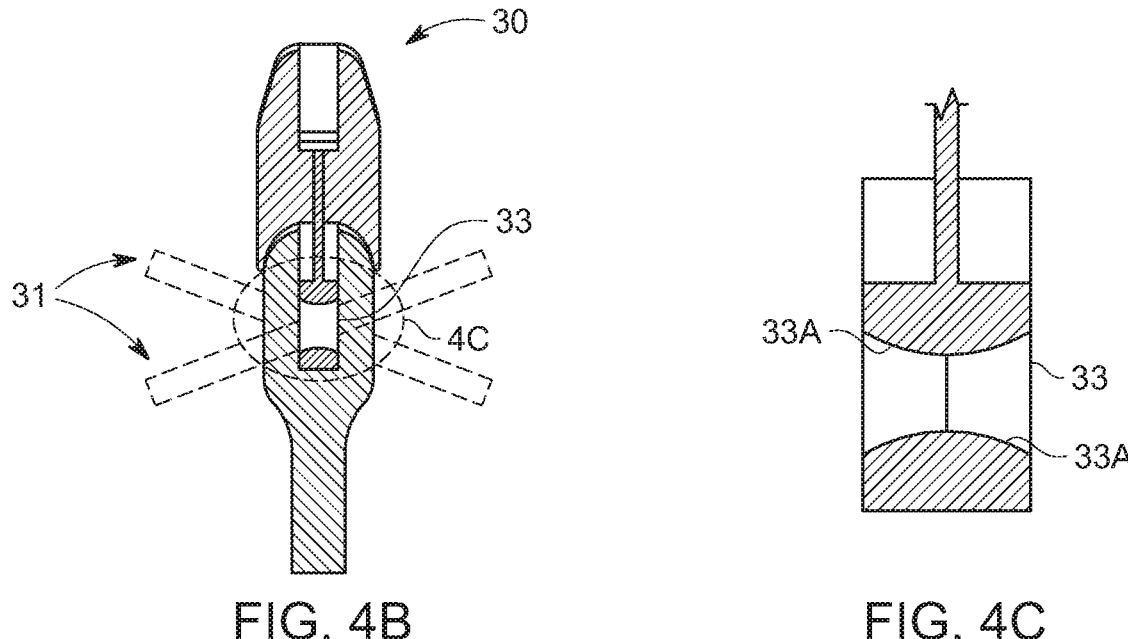
FIGS. 4B and 4C show a bearing adapter with a catenoid-shaped bearing opening.

Turning now to FIGS. 4A-C, these figures show features of a bearing adapter, in this case, adapter 30 shown in FIG. 2, that may be used with various embodiments of the invention. Although the bearing housing shown in 4A matches the one in FIG. 2, it should be appreciated that adapter 40 of FIGS. 3A-C, or even other adapters, may be also be used with the various embodiments shown in FIGS. 4A-C. In fact, these features may be usable with various other types of top-down or even bottom-up style trackers as well. Starting with 4A, this figure shows a front view of exemplary bearing adapter 30. As with the other adapters, it is substantially cardioid-shaped with opposing symmetrical S-shaped arms 34. Line A-A bisecting the middle of adapter 30 passes through cusp 32 and bearing 33 below it. FIG. 4B shows an internal cross-sectional view taken along bisecting line A-A and FIG. 4C is a close-up of bearing surfaces 33A inside the adapter 30. As seen in 4B and 4C, bearing 33 in adapter 30 is an opening passing completely through adapter 30 that provides a bearing surface for a bearing pin to rotate within. The bearing surfaces 33A together make a catenoid shaped opening. In the cross-section view, this appears as a pair of generally convex surfaces, indicating that the diameter is narrowest at the middle and gets larger traveling towards the bearing opening on either side. Although this surface is shown as being catenoid-shaped, in some embodiments, the surface may be shaped as a ramp that goes up from either opening to an apex at the middle. When the bearing pin is inserted into bearing 33, convexly curved bearing surfaces 33A allows the pin to articulate several degrees in any direction within the bearing. In various embodiments, this may relieve stress and strain on the torque tube, torque tube support brackets, and even the foundation, due to misalignment from bearing adapter to bearing adapter. A bearing surface with a uniform diameter requires that each bearing housing be oriented substantially identically. Accomplishing that may be difficult in real world conditions where anchors are driven with heavy equipment in dirt on terrain of varying grade and moisture content. The catenoid-shaped bearing opening according to this embodiment should extend the functional life of the tracker system by allowing the bearing pin to rotate without trying to move the bearing or the foundation into alignment or trying to bend the torque tube to compensate for misalignment. The dotted line in 4B shows different possible orientations of the bearing pin within the catenoid-shaped bearing.

Figure 5:
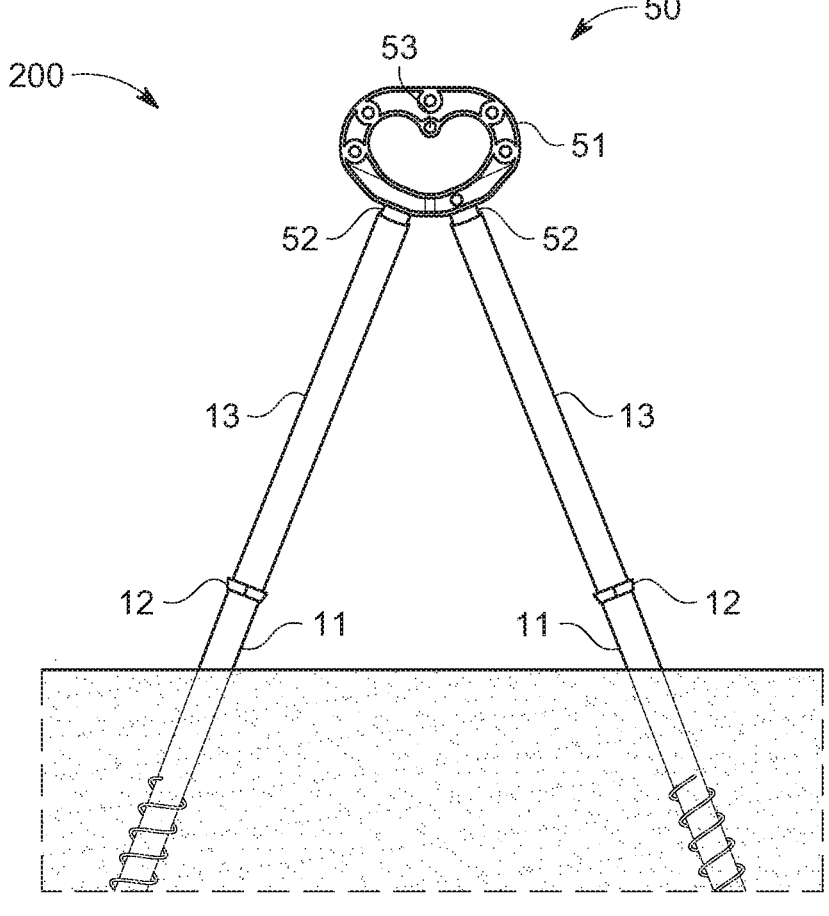
FIG. 5 shows a cardioid-shaped bearing adapter and truss foundation according to various embodiments of the invention.

Turning now to FIG. 5, this figure shows an exemplary truss foundation and bearing adapter system 200 according to various embodiments of the invention. As with other embodiments, the truss foundation consists of a pair of truss legs 10 that extend below and above ground. Each leg 10 consists of a screw anchor 11 that is driven nearly all the way into the ground and an upper leg 13 that substantially extends the axis of its corresponding screw anchor. Coupler 12, attached to the head of the screw anchor or built into it, serves as the platform on which to attach the upper leg. A crimp joint, pin, threads or other suitable mechanical fastener may be used to join the upper legs 13 to their respective screw anchors 11. Upper legs 13 terminate as open tubes. Bearing adapter 50 is the cardioid-shaped member at the top of the truss. It includes a pair of connecting portions 52 that are received into the adjacent upper legs 13 before the legs are crimped or otherwise secured to bearing adapter 50. Adapter 50 includes a provides a cardioid-shaped opening with bearing 53 formed at the cusp of that opening. In various embodiments, a bearing pin is received within bearing 53 and one or more torque tube support brackets are attached to the bearing pin to suspend the torque tube.

In some embodiments, the bearing and connecting portions may be positioned so that a line through the center of mass of each connecting portion approximately intersects at the bearing. This will result in the rotational axis of the tracker, in this example, the bearing pin, being aligned with the apex or work-point of the truss. This ensures that nearly all lateral loads are translated into the truss legs as axial forces while minimizing the extent of any bending moments. This consideration is unique to truss foundations because monopiles translate lateral loads into bending moments by design. They are oversized primarily to resist such moments.

Figure 6A:
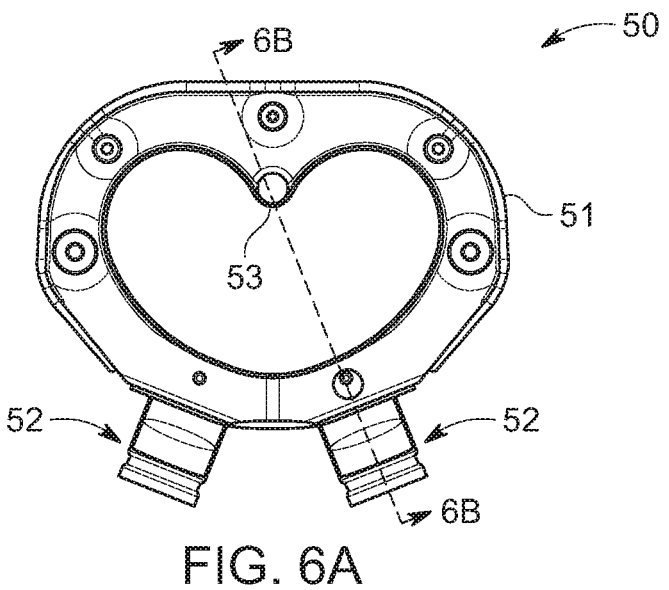
FIGS. 6A-C show various views of the cardioid-shaped bearing adapter of FIG. 5.
Figure 6B:
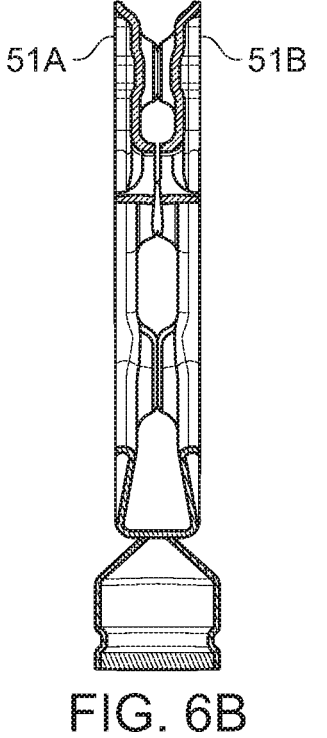
Figure 6C:
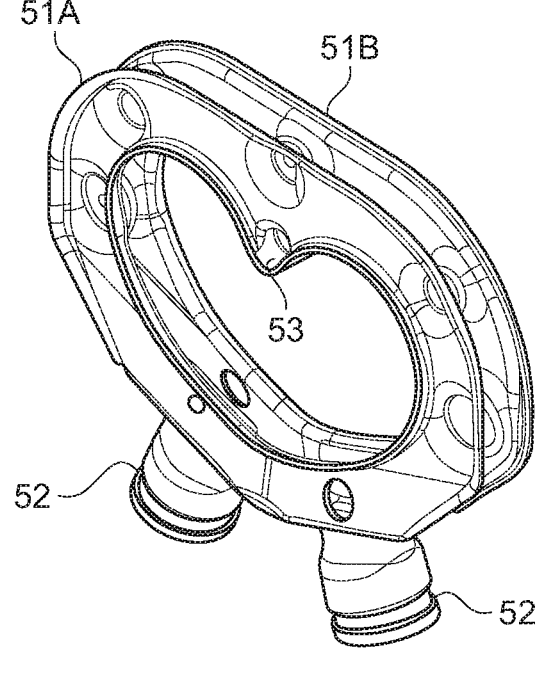

FIGS. 6A-C show front, side, and perspective views respectively of bearing adapter 50 of FIGS. 6A-C. As shown, adapter 50 has a main body portion 51 that is formed form a pair of substantially identical cardioid-shaped plates labeled 51A/B in FIG. 6B that are joined with clinch or press joints. A clinch joint is formed by using a punch and die assembly to push a projection formed in one piece into recess formed in the other causing some underflow at the bottom that locks the two pieces together. Clinch joints are advantageous because they do not require heat, welding or chemicals. It should be appreciated, however, that the number of clinch joints shown here are exemplary only and should not be interpreted as limiting on the invention. Moreover, different methods other than clinching may be used or the entire piece may be made from a single casting.

Then, after the cardioid-shaped main body portion 51 is formed, a pair of connecting portions 52 are attached along the bottom of body portion 51 to join enable the adapter to join a pair of adjacent upper legs. Once pieces 51A and B are joined, connecting portions 52 may be bolted, welded or otherwise attached at the appropriate angle to match the angle of truss legs 10 and ensure that they point at bearing 53. This will maximize the extent which lateral loads are translated into axial loads rather than bending moments.

Figure 7:
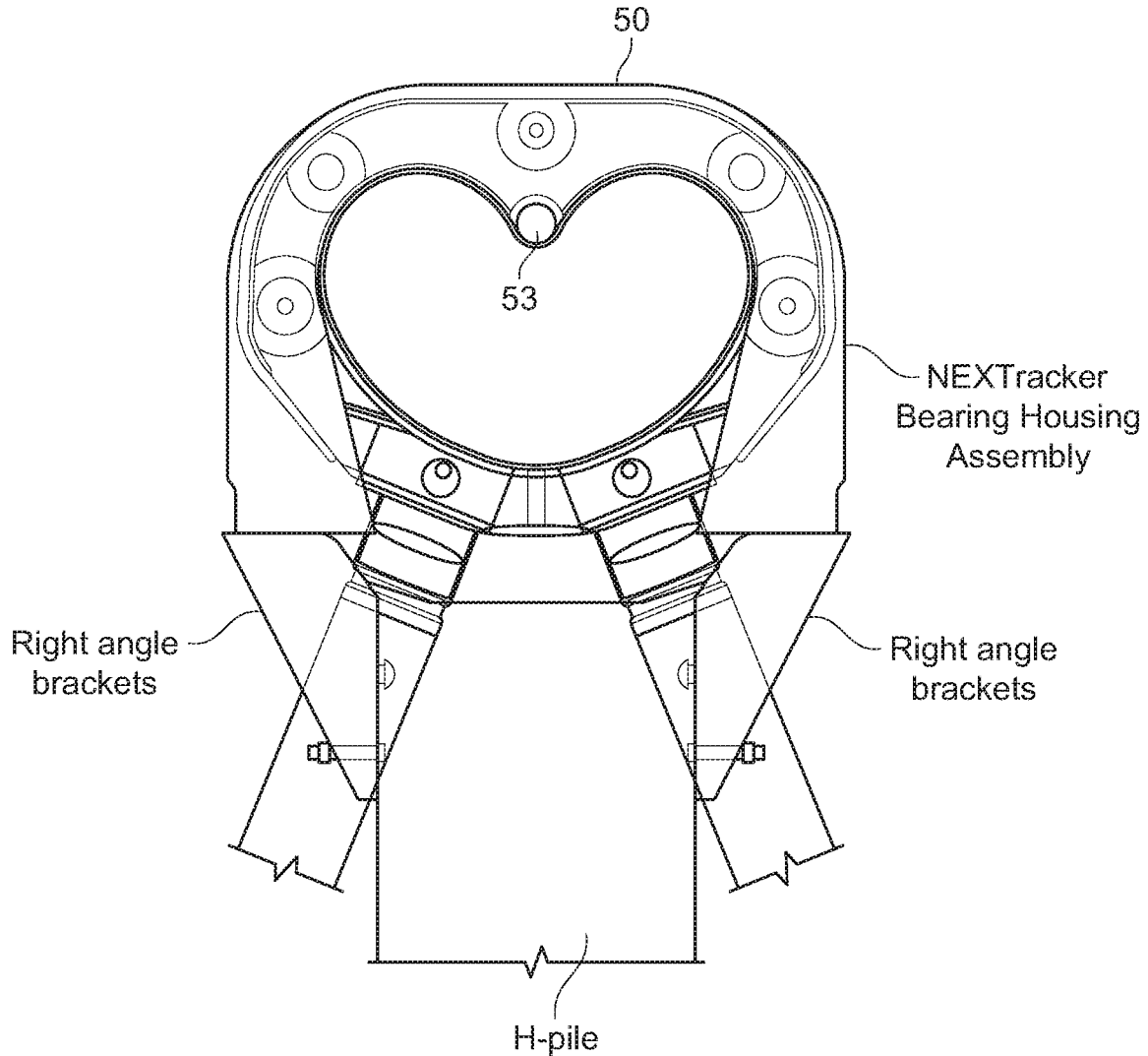
FIG. 7 shows the bearing adapter of FIG. 5 superimposed over a prior art bearing housing assembly.

FIG. 7 combines views of bearing adapter 50 shown in FIGS. 5, 6A-C with a so-called bearing housing assembly used in a conventional single-axis tracker when supported by a monopile foundation. The bearing housing assembly shown here is from the NX SERIES single-axis tracker manufactured and sold by NEXTRACKER, INC of Fremont California. In this overlapping view, it can be seen that the height and width of both the bearing housing assembly (BHA) and bearing adapter 50 are substantially the same, with both defining at least a partial cardioid-shaped opening and having co-located bearings. The NEXTRACKER BHA is designed to sit on a flat surface, but the swing of the torque tube requires greater spacing than can be provided by a 6-inch wide H-pile (e.g., W6×9 or W6×12). Therefore, NEXTRACKER manufactures right angle brackets that provide a horizontal mounting surface for the BHA and also translate the load of the tracker into vertical interfaces that can be attached to the opposing flanges of the H-pile. They also widen the stance of the H-pile to accommodate the cardioid-shaped opening. Finally, they raise the height of the bearing and provide some degree of vertical height adjustment to be aligned with other BHAs in the same row.

By contrast, the truss foundations and bearing adapters according to various embodiments of the invention enable the H-pile flanges, right angle brackets and the bearing assembly to be functionally combined into a single part, making the single-axis tracker less expensive when supported by a truss foundation and bearing adapter relative to a monopile. The bearing adapter coupled to truss legs eliminates the need for the pedestals, right-angle brackets H-pile flanges and the numerous Huck bolts or other fasteners used to connect these components together. It accomplishes all this while remaining dimensionally compatible with the remaining single-axis tracker components (e.g., bearing pin, torque tube support bracket, torque tube, module brackets, etc.).

It should be appreciated that in tracker arrays, not all system components are exposed to the same forces. The outer row or first few outer rows may be made more robust than the rows making up the inside of the array since the interior rows are to some extent shielded from wind by the outer ones. To that end, tracker components and even foundation components may differ between outer rows and inner ones, as well as between those that supporting the torque tube versus those supporting drive motors and/or other driveline components. In various embodiments, the bearing adapters shown in FIGS. 3A, 4A, 5 and 6A-C are designed for standard loads, that is, internal portions of the tracker array depending on where the tracker is installed, soil conditions, and prevailing weather, among other factors. Trusses and bearing adapters intended for outside rows may have different configurations such as shown in subsequent embodiments.

Figure 8:
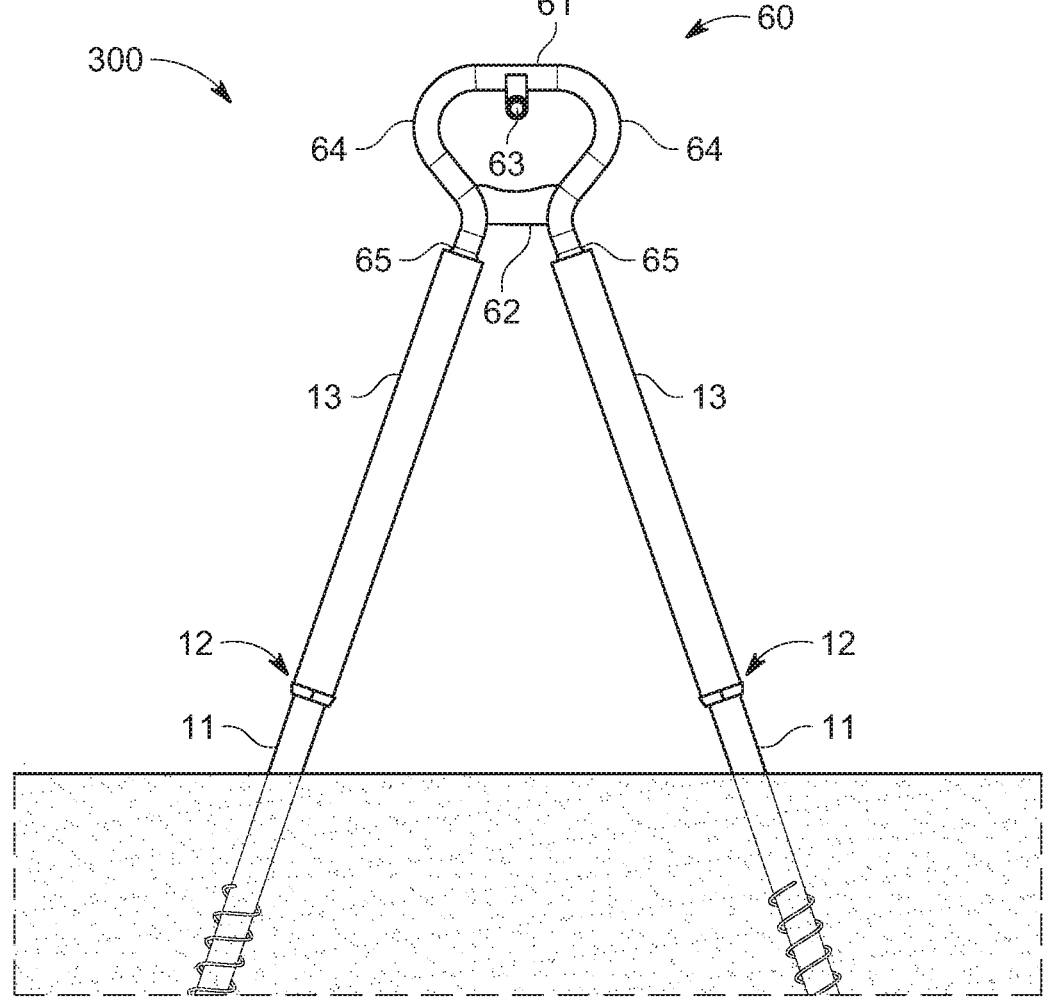
FIG. 8 shows another bearing adapter and truss foundation according to various embodiments of the invention.

Turning now to FIG. 8, as well as FIGS. 9A-C, these figures show another truss foundation and bearing adapter according to various embodiments of the invention that may be more suitable for outside rows and/or installations that require greater strength than the bearing adapters shown in association with other embodiments. Beginning with FIG. 8, this figure shows a truss foundation and bearing adapter according to various other embodiments of the invention. The lower portion of the truss foundation shown here is substantially the same as that in other embodiments. It is made up of a pair of truss legs 10 that each consist of a driven screw 11 anchor coupled to an upper leg 13 via coupler 12. One or more crimps, bolts or other mechanical fasteners may secure each upper leg 13 to its respective coupler. Alternatively, coupler 12 may be a separate casting or piece that is attached to the lower end of the upper leg or a set of features that are stamped or otherwise formed in the upper end of the screw anchor.

The truss legs shown in these figures are also joined by bearing adapter 60, which in this example, may be stronger than that shown in FIG. 1. The bearing adapter shown here is formed from a pair of tubular S-shaped members 64 that are joined at one end by a straight bridge member 61 with bearing 63 in the approximate middle. The other end of each S-shaped member 64 terminates in a connecting portion 65 that, in various embodiments, is received within the open end of each upper leg 13. In addition, as shown, a gusset plate 62, brace or other reinforcement may connect S-shaped members 64 at their narrowest point to resist separation and torsion. In various embodiments, bearing adapter 60 may be formed of bent steel tube, interconnected sections of steel tube or a combination of these, and may have a round, square, or oval cross-section, among other possibilities.

FIGS. 9A-C are front, section and perspective views respectively of bearing adapter 60 shown in FIG. 8. FIG. 9B is a section view along the line A-A in 9A. As seen in 9A, bearing adapter 60 is made of a pair of substantially identical but opposing S-shaped members 64 that begin at a common bridge portion 61 in the middle of the adapter and terminate in respective connecting portions 65. Bridge 61 includes bearing 63 that in this example, is welded to brackets on either side of the bridge and hangs slightly below the bridge so that bearing 63 passes entirely through adapter 60. Alternatively, bearing 63 may be built into bridge 61. Gusset plate or support brace 62 joins opposing S-shaped members 64 at their narrowest point to provide extra strength. As shown, connecting portions 65 are adapted to fit within respective upper legs 13 so that legs 13 may be crimped around them. It should be appreciated that in other embodiments, upper legs 13 may fit inside the connecting portions and that bolts, pins, or other suitable mechanical fasteners may be used to join connecting portions 65 to their respective upper legs 13.

Figure 10:
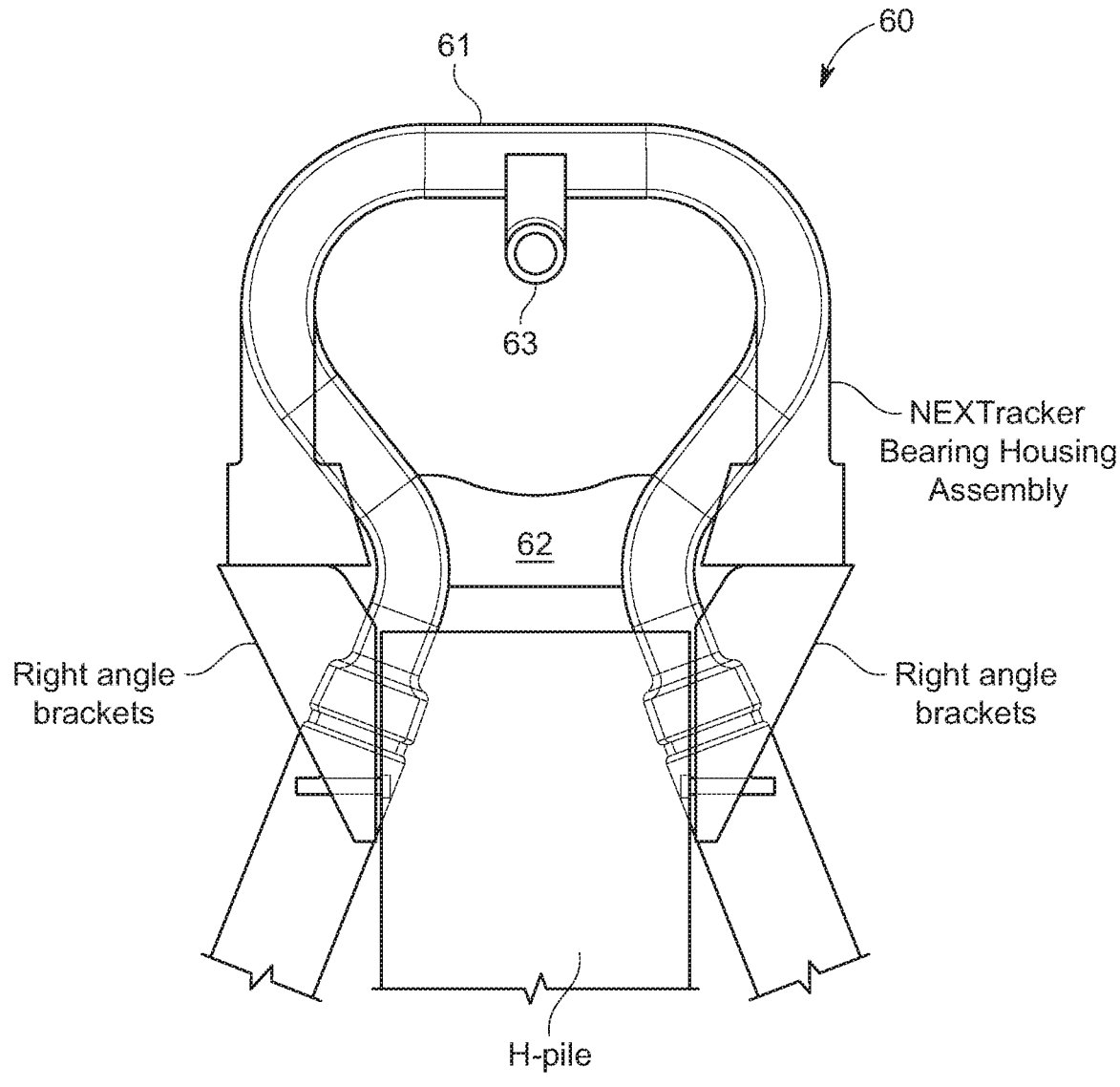
FIG. 10 shows the bearing adapter of FIG. 8 superimposed over a prior art bearing housing assembly.

FIG. 10 is a front view of bearing adapter 60 shown in FIGS. 8 and 9A-C superimposed with a conventional prior art bearing housing assembly. The prior art BHA is again o NEXTRACKER NX SERIES single-axis tracker that has been designed to attach to a single H-pile. It is formed from an upside-down-U-shaped section of steel tube that terminates on either side in a set of pedestals that rest on respective right-angle brackets attached to the vertical flanges of the H-pile. As seen in image of FIG. 10, as with the bearing adapter shown in FIG. 7, the bearings of the prior art BHA and bearing adapter 60 according to the various embodiment of the invention overlap and the height and width of these structures are substantially the same. The differences lie in the bearing adapter's bottom end geometry that allows it to mate with angled truss legs rather than a conventional H-pile. This eliminates the need for the pedestals, right-angle brackets and upper flanges of the H-pile as well as the Huck bolts or other fasteners used to connect them together while remaining dimensionally compatible with the remaining single-axis tracker components (e.g., bearing pin, torque tube support bracket, torque tube, module brackets, etc.).

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A bearing adapter for a single-axis tracker comprising:
a main body portion having a cusp and a bearing formed proximate to the cusp wherein the main body portion defines a cardioid-shaped opening;
a bearing pin in the bearing, wherein the bearing pin provides an axis of rotation for a torque tube suspended within the cardioid-shaped opening of the main body, and
wherein the torque tube is suspended from the bearing pin such that the torque tube rotates about the bearing pin; and
a pair of connecting portions, each connecting portion of the pair of connecting portions comprising a proximal end portion and a distal end portion, the pair of connecting portions angled apart from one another at a fixed angle of separation with the proximal end portion of each connecting portion projecting away from the main body portion at respective locations at the main body portion below and offset to opposite sides of the cusp, wherein the connecting portions are adapted at the distal end portion of each connecting portion to connect to a pair of angled truss legs extending into underlying ground to form an A-framed shape foundation structure with the ground for a single-axis tracker with an integral bearing, wherein the connecting portions are oriented with respect to the main body so that a line through the center of the distal end portion of each connecting portion substantially intersects the proximal end portion and the bearing, and wherein each connecting portion of the pair of connecting portions is configured at the distal end portion to connect to a respective angled truss leg of the pair of angled truss legs to orient the line to intersect the respective truss leg, wherein the connecting portions terminate in respective crimp connectors having at least one channel circumscribing an outer surface thereof.

2. The bearing adapter according to claim 1, wherein the cardioid-shaped opening defines a first plane and the bearing is oriented substantially orthogonal to the first plane.

3. The bearing adapter according to claim 1, wherein the bearing has a catenoid shape to enable the bearing pin to compensate for lack of orthogonality between the torque tube and the first plane.

4. The bearing adapter according to claim 1, wherein the main body portion is formed from a pair of matching members joined together with clinch joints.

5. The bearing adapter according to claim 1, wherein each connecting portion of the pair of connecting portions is configured at the distal end portion to orient a central longitudinal axis of the respective angled truss leg of the pair of angled truss legs coaxial with the line.

6. The bearing adapter according to claim 1, wherein the pair of connecting portions are offset to opposite sides of the cusp and angled apart from one another at the fixed angle of separation in a common plane that extends between underlying ground and the bearing pin.

7. The bearing adapter according to claim 1, wherein the line is circumscribed by the at least one channel.

8. A bearing adapter for a single-axis tracker having an offset drive assembly comprising:
a main body defining a cardioid-shaped opening;
a bearing formed in the main body proximate to a cusp of the cardioid-shaped opening;
a bearing pin in the bearing, wherein the bearing pin provides an axis of rotation for a torque tube suspended within the cardioid-shaped opening of the main body, and
wherein the torque tube is suspended from the bearing pin such that the torque tube rotates about the bearing pin; and
a pair of connecting portions, each connecting portion of the pair of connecting portions comprising a proximal end portion and a distal end portion, the respective proximal end portion of each connecting portion projecting away from the main body in a common plane that extends between underlying ground and the bearing pin and at a fixed angle of separation, wherein the connecting portions are oriented with respect to the main body in the common plane so that a line through the center of the distal end portion of each connecting portion substantially intersects the proximal end portion and the bearing in the common plane, wherein the connecting portions are configured at the distal end portion of each connecting portion extending in the common plane to join to a pair of angled truss legs such that a central longitudinal axis of each of the pair of angled truss legs extend in the common plane and into underlying ground to form an A-framed shape foundation structure with the ground for a single-axis tracker with an integral bearing and such that the line is oriented to intersect the respective truss leg of the pair, and wherein the connecting portions terminate in respective crimp connectors having at least one channel circumscribing an outer surface thereof.

9. The bearing adapter according to claim 8, wherein the bearing has a catenoid shape to enable the bearing pin to compensate for lack of orthogonality between the torque tube and the bearing.

10. The bearing adapter according to claim 8, wherein the connecting portions are oriented with respect to the main body in the common plane so that a line in the common plane through the center of each connecting portion substantially intersects at the bearing pin in the common plane at one end of the line and substantially intersects the respective one of the pair of angled truss legs in the common plane at another, opposite end of the line.

11. The bearing adapter according to claim 8, wherein the line in the common plane is circumscribed by the at least one channel where the line intersects the respective one of the pair of angled truss legs in the common plane.

* * * * *